(12) United States Patent
Goldstone

(10) Patent No.: US 7,196,807 B2
(45) Date of Patent: Mar. 27, 2007

(54) ENCRYPTED E-MAIL MESSAGE RETRIEVAL SYSTEM

(75) Inventor: Jonathan Goldstone, Jerusalem (IL)

(73) Assignee: Comverse, Ltd., Tel Aviv (IL)

( * ) Notice: Subject to any disclaimer, the term of this patent is extended or adjusted under 35 U.S.C. 154(b) by 808 days.

(21) Appl. No.: 10/058,189

(22) Filed: Jan. 29, 2002

(65) Prior Publication Data
US 2003/0142364 A1 Jul. 31, 2003

(51) Int. Cl.
G06F 3/12 (2006.01)
H04N 1/00 (2006.01)

(52) U.S. Cl. .................... 358/1.15; 358/1.14; 358/402; 358/403

(58) Field of Classification Search ............... 358/1.13, 358/1.15, 402, 403, 404, 407, 434, 1.14, 358/1.1; 713/150, 152; 380/243
See application file for complete search history.

(56) References Cited

U.S. PATENT DOCUMENTS

| | | | | |
|---|---|---|---|---|
| 5,608,786 | A * | 3/1997 | Gordon | 370/352 |
| 6,654,601 | B2 * | 11/2003 | Picoult et al. | 455/412.1 |
| 6,741,705 | B1 * | 5/2004 | Nelson et al. | 380/257 |
| 2002/0004899 | A1 * | 1/2002 | Azuma | 713/152 |
| 2002/0016910 | A1 * | 2/2002 | Wright et al. | 713/150 |
| 2002/0124167 | A1 * | 9/2002 | Toyota et al. | 713/150 |
| 2004/0185877 | A1 * | 9/2004 | Asthana et al. | 455/456.6 |
| 2005/0009502 | A1 * | 1/2005 | Little et al. | 455/411 |

OTHER PUBLICATIONS http://ww.cs.ucl.ac.uk/staff/I.Brown/proxy/: Jan Brown and C.R. Snow: A proxy approach to e-mail security; published in Software—Practice and Experience, 29(12) 1049-1060, Oct. 1999.
http://dcb.sun.com/practices/howtos/kssl.jsp: Carla King: "Securing the Wireless Internet Using "Kilobyte" SSL"; Dot Com Builder, Jul. 18, 2001.

(Continued)

Primary Examiner—Dov Popovici
(74) Attorney, Agent, or Firm—Sughrue Mion, PLLC

(57) ABSTRACT

An electronic message retrieval system in which the electronic message, and any corresponding attachments, can be encrypted by the sender of the message and routed to the intended recipient, even if the intended recipient is in a mobile location or it is otherwise inconvenient for the recipient to receive the electronic message in the form in which it was sent. The system provides an alarm or indication to the intended recipient, wherever he or she is, that a message has been delivered, an indication of the subject of the message and who sent the message, and whether the message is encrypted. The intended recipient then has the choice of deferring retrieval of the message until a later time when he or she can log onto a secure system and decrypt the message conventionally, or providing the system with a password or "key" which will permit the system to decrypt the message, convert it into a format retrievable by the mobile recipient, i.e., audible format for phone delivery, facsimile data for fax delivery, etc., and deliver the message to the mobile recipient.

26 Claims, 5 Drawing Sheets

OTHER PUBLICATIONS http://www.computerworld.com/storyba/0,4125,NAV47_STO66177,00.html: Mathias Thurman: "Making the Airwaves Safe For Corporate E-Mail Users"; Computerworld; Dec. 3, 2001.

http://www.computerworld.com/itresources/restory/0,4167,STO67204_KEY68,00.html: George A. Chidi, Jr.IDG News Service; Computerworld; Jan. 8, 2002.

http://wireless.newsfactor.com/perl/printer/11485/: Mike Mayor: Security App Encrypts Attachments for PDAs, Wireless NewsFactor®; Jun. 22, 2001.

http://www.networkmagazineindia.com/200110/shelf1.htm: Network Magazine India; Symmetrix 8000 enterprise storage family; Jan. 22, 2002.

* cited by examiner

ENCRYPTED E-MAIL MESSAGE RETRIEVAL SYSTEM

FIELD OF THE INVENTION

The present invention relates generally to a communication system that allows for the retrieval of encrypted messages through different media. In particular, in accordance with one embodiment of the invention, encrypted attachments to a an e-mail message, transmitted over a communication network using one medium, such as a computer transmitting over a wide area network accessing the Internet, are recognized and decrypted by the intended e-mail message recipient using a second, different, network medium, such as a cellular phone, pager, personal digital assistant (PDA), etc. By utilizing either symmetric or asymmetric encryption technology, the integrity of the encrypted e-mail message, and its attachment, is maintained.

BACKGROUND OF THE INVENTION

The technology of transforming a received e-mail message to a different format, i.e., e-mail-to-voice or e-mail-to-facsimile data, etc., is well known in the art. One advantage gained by employing these techniques is that format transformation of the e-mail message oftentimes permits the intended recipient of the message to receive the message more quickly than if such transformations were unavailable. For example, an e-mail user may physically be at a location which is inconvenient for receiving e-mail messages, such as in his or her car or in a meeting. In order to guarantee immediate receipt of e-mail messages, the user may have his e-mail messages forwarded from his computer, which is physically connected to the e-mail network, to his cellular phone, pager, PDA, fax machine or any other device that will make retrieval of the e-mail message more convenient.

Accordingly, when an e-mail message is received by the recipient's computer, the message is converted into an appropriate format and transferred to the recipient's cellular phone, etc. Upon receipt of the message, the phone then indicates receipt of the message, i.e., by activating an audible and/or visual alarm recognized by the recipient. The recipient can then identify the respective sender of the message and/or subject and determine whether or not to retrieve the message immediately, defer receipt until a later time, or delete the message without opening it.

One issue that concerns virtually all e-mail users is the security of the content of the messages. Because e-mail messages are typically sent over the Internet, from one network to another, they are subject to being passed through various devices between the time the message leaves the sender's machine and the time the message reaches the recipient's machine. Each one of the various devices the e-mail message, and any corresponding attachments, passes through along its journey is capable of copying and/or altering the message content, thus, exposing the message content to malicious interceptions. Also, in some countries, government agencies routinely monitor e-mail message content. Accordingly, it has become a favorable practice among e-mail users to encrypt private or otherwise sensitive material that either party, sender or recipient, desires to remain confidential.

Encryption, or cryptography, is the technique of converting plain information into unintelligible information and re-converting the unintelligible information back into an intelligible, preferably the original, form. Cryptography has existed for centuries but it has recently been given significantly more attention as a result of the advent of e-commerce, privacy concerns and the Internet. Fast, cheap, high-powered computers and communications systems are enabling the development of new cryptographic systems and methodologies and, along with them, the ability to crack/decipher the codes.

One conventional encryption technique is referred to as the "shared secret" technique. The shared secret technique consists of a single mathematical "key" used for both encryption and decryption of data. This type of cryptographic system is sometimes also referred to as "symmetric" cryptography because the same "key" both encrypts and decrypts the message. Both the sender and the recipient of a message, such as an e-mail message, must possess the same mathematical key and the parties are responsible for physically maintaining the secrecy and security of the key to ensure the privacy and security of their communication.

In shared secret, or symmetrical, encryption, the sender of a message encrypts the message using any of a virtually limitless number of encryption keys. Encryption keys are often in the form of a mathematical algorithm. Upon receipt of the message on the recipient's computer, after being passed through various intermediary machines as an encrypted message, the recipient decrypts the message by using the same key, in reverse, as the sender used to encrypt the message. Obviously, in order for this system to work, the sender and the recipient must each know which key was used to send the message. Accordingly, the parties typically agree on an algorithm through various "offline" means, such as a private telephone conversation, a separate e-mail message, etc.

Another encryption technique, one that improves upon the "shared secret" method, is known as "Public Key" cryptography. Public Key cryptography employs a two-key system wherein the two keys are asymmetric, or completely different. However, even though the two keys are different, they comprise a set and work together to encode and decode information. One key is kept private, or secret, by one of the parties and the other key is made readily available to the public. However, the second key is typically retained in a trustworthy repository. When a public key is used to encrypt a message, only the private key from the pair is capable of decrypting the message. Thus, in public key cryptography, anyone can send secret messages to the holder of a private key because the matching public key is readily available, yet no one other than the intended recipient, who possesses the matching private key, can decrypt the message. Therefore, regardless of the number of people that come into possession of the message, the integrity of the message content is maintained.

Public Key cryptography has lead to several other useful innovations, such as the digital signature. A digital signature is much like a hand-written signature in that it provides proof that the originator of the message is actually who the person claims to be (a process known as "Authentication"). A sender "signs" messages by passing them through a mathematical algorithm, known as a "hash" function, and produces a summary, or "hash", of the subject message. Mathematically, this summary, or hash, is unique for every message, similar to the way a fingerprint is unique for every person. The sender then encrypts the hash with his private key and attaches the code to the end of the message. This attached code is the digital signature. The intended recipient, upon receipt of the encrypted message and sender signature, verifies the authenticity of the message and proves that it has not been altered in transit by decrypting the digital signature with the sender's public key and passing the message through the same hash function, in reverse. If the two hash codes are the same, it can be confirmed that the message was indeed sent from the holder of the matching private key (Non-repudiation) and that it was not altered (Integrity).

A Public Key Infrastructure (PKI) refers to the entire Public Key system. A PKI comprises the keys as well as one or more trusted systems known as Certification Authorities (CA). These CAs are organized in a tree-like hierarchical structure. Each user's Public Key and identification are placed in a digital certificate. The CA digitally signs each certificate and makes the certificates freely available by publishing them in publicly accessible directories. Any client, or user, of the PKI may access any other users' Public Key and verify the authenticity by using the CA's Public Key to verify the CA's signature on the certificate. The CA at the top of the hierarchy signs certificates of subordinate CAs and these CAs in turn sign certificates of CAs below themselves and so forth. This system establishes a chain of trust in a distributed CA system., including cryptographic keys and a certificate management system. The PKI enables secure transactions and private exchange of information between parties who may either be well known to each other or complete strangers. PKI provides privacy, integrity, authentication, and non-repudiation for applications and electronic commerce transactions.

There are a variety of free and commercial packages available for performing either type of encryption, i.e., symmetrical and/or asymmetrical. There are also companies that offer software packages for encryption. Network Associates, Inc., for example, offers a freeware and a commercial package that allow an e-mail message attachment to be encrypted as a self decrypting archive (SDA). It is assumed that there are other similar packages available and that it is possible for a skilled artisan to replicate or enhance these offerings.

However, most current handsets, e.g., wireless phones, pagers, PDAs, etc., do not have the computational power to decrypt e-mail messages that are coded using these methods. A key can be considered secure if it can not be cracked in a reasonable amount of time by brute force (i.e., trying all combinations sequentially), even if cracking the key requires using many computers. The security of a key, i.e., its ability to withstand attempts to decipher it, is in relation to its length. In other words, the longer the actual mathematical code used to create the key, the more difficult it is to decode/decipher the key and, thus, the more secure the key is. However, decoding long keys makes the job of the handset more difficult. In the handset, low available computational power makes it impractical to decrypt anything but short simple and, therefore, insecure codes.

Currently, when an encrypted e-mail message is received by a user, there is no reasonable method, due to the limitations explained above, by which the recipient can decrypt the e-mail message using only the mobile handset. The e-mail message could be decrypted by the e-mail server, but it is accepted in the industry that a reasonable person receiving an encrypted e-mail message would not leave the decryption password stored on an operator's server where it could be legally, or illegally, intercepted. It is also reasonable to assume that the sender would prefer that confidentiality not be compromised in this way.

Accordingly, in accordance with conventional methods, a recipient of an encrypted e-mail message, in order to maintain the integrity of the message content, is required to download the message and decrypt it locally on his own computer, which is a secure machine where, typically, the keys are stored. The recipient, even if notified of the receipt of an e-mail message on his phone, PDA, pager, etc., will not be able to view the message, or listen to it, immediately without compromising the integrity of the message, i.e., without providing the decryption "key" on the open, unsecure system/server as explained above. In most cases, providing the key on an open system in this manner also compromises future messages, since those future messages typically utilize the same password. This becomes, as a minimum, an inconvenience to the recipient, and possibly to the sender, when the recipient is mobile and not physically located where secure message retrieval is possible.

SUMMARY OF THE INVENTION

In view of the aforementioned problems with the conventional approach to e-mail message encryption, decryption and delivery, it is an object of the present invention to provide a communication system in which encrypted e-mail messages and/or their corresponding attachments can be decrypted and converted to another format to be delivered to some other device other than the recipient's main, secure, machine (e.g., his or her PC).

A further object of the present invention is to perform the above-mentioned message conversion (hereinafter referred to as "e-mail-to-other" format conversion) and delivery without significantly compromising the integrity of the e-mail message content.

In accordance with one embodiment of the present invention, a system is provided in which an e-mail message recipient is notified of, (1) receipt of an e-mail message; (2) the identity of the sender of the e-mail message; (3) the subject of the e-mail message; and (4) an indication of whether the e-mail message is encrypted. The recipient of the e-mail message then has the choice of either downloading the e-mail message on a secure machine at a later time or opening the e-mail message immediately by providing the system with the appropriate decryption key. According to this embodiment, the shared secret or SDA encryption method and the e-mail-to-other format techniques are integrated into a system that allows an e-mail message recipient to simultaneously retrieve encrypted e-mail messages and convert them into a format so they can be displayed readily by or on various types of devices.

In accordance with another embodiment of the present invention, a system is provided in which an e-mail message recipient is notified, either by his normal e-mail provider or by a previously arranged proxy server, of receipt of an e-mail message; the sender's identity; a subject of the message; and an indication of whether the message is encrypted. The recipient then has the choice of either downloading the message on a secure machine at a later time, further encrypting the message using his own public key, deleting the message or having the system process the message using one or more of any available e-mail-to-other format techniques that will deliver the e-mail message to the recepient in a secure way without requiring access from the recipient's secure computer.

In accordance with yet another embodiment of the present invention, a system is provided in which an e-mail message recipient is notified, either by his normal e-mail provider or by a previously arranged proxy server, of receipt of an e-mail message; the sender's identity; a subject of the message; and an indication of whether the message is encrypted. The recipient then has the choice of either downloading the message on a secure machine at a later time or opening the message immediately by using one respective private key corresponding to one of a variety of public keys used to encrypt the message, as discussed in more detail below.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE PREFERRED EMBODIMENTS

Several embodiments of the present invention are discussed in detail below. While specific configurations are discussed, it should be understood that the specific embodiments discussed are for illustration purposes only. A person skilled in the relevant art will recognize that other components and configurations may be used without departing from the spirit and scope of the invention. For example, although some of the presented embodiments include a proxy that is located at or near the e-mail server, it is recognized that the functionality of the proxy could also be performed as a client application, e.g., on each recipient's computer.

Embodiment 1

Figure 1:
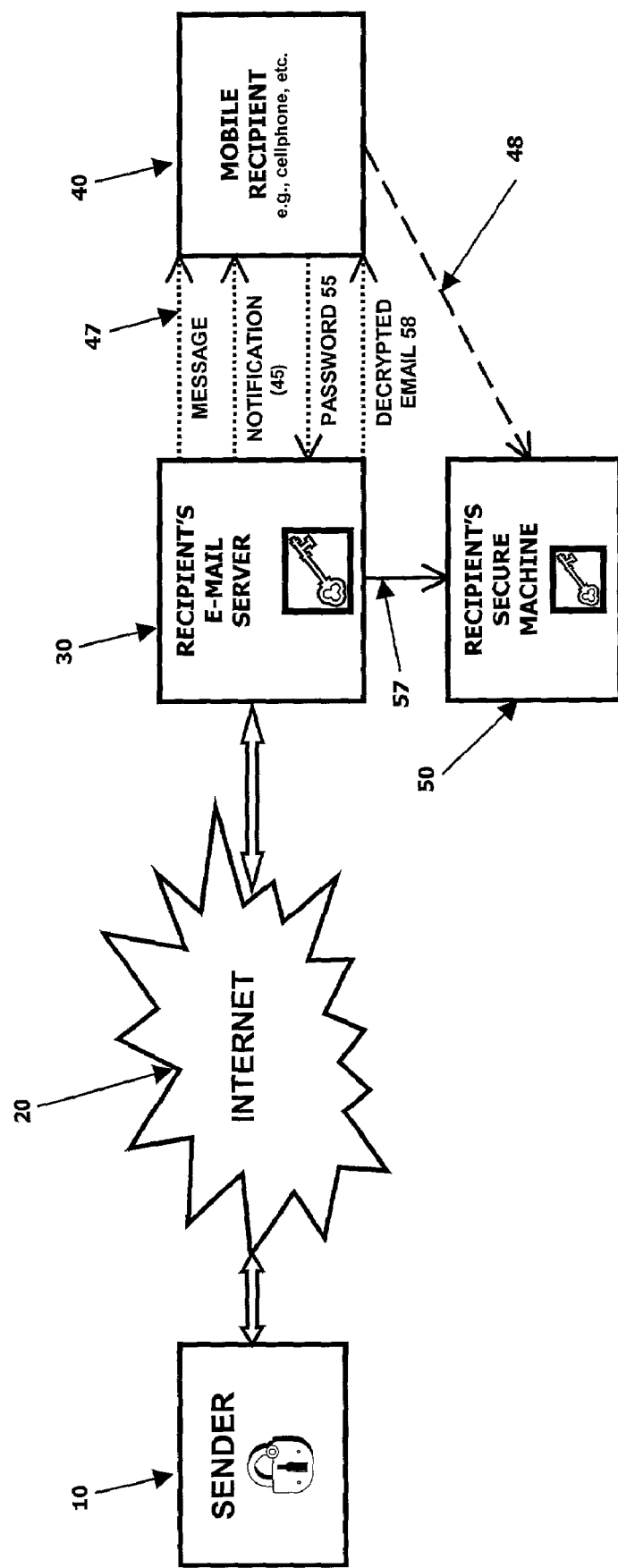
FIG. 1 is a diagrammatic view of a first embodiment of the present invention.

In accordance with a first embodiment of the present invention, in reference to FIG. 1, the sender 10 of an encrypted e-mail message sends the message, along with any corresponding attachment(s), through the Internet 20, or some other similar network, to the intended recipient's e-mail server 30. Upon receipt of the encrypted e-mail message by the recipient's e-mail server 30, the recipient 40 is alerted by activation of an audible and/or visual notification 45. Further, within the notification message 47, passed on by the e-mail server 30, the e-mail server 30 informs the recipient 40 of: (1) the identity of the sender of the e-mail message, (2) the subject of the e-mail message, and (3) whether the content of the e-mail message is encrypted.

Recipient 40 then has the choice of deferring retrieval of the message to a later time when the recipient can conveniently connect in the standard method, e.g., using a secure machine 50 connected to his e-mail server 30, where he can decrypt the encrypted message 57 locally, or retrieving the message immediately by sending a password or shared secret 55 to the e-mail server 30 and receiving the decrypted e-mail message 58 from the e-mail server. As represented by the thick dashed line 48 connecting the recipient 40 to the recipient's secure machine 50, if the recipient decides to defer message retrieval until a later time, he will need to travel to the location of the secure machine 50, and cannot retrieve the message remotely, as is possible in accordance with the the invention.

The password, or shared secret 55, can be provided by the recipient to the e-mail server using a variety of different methods. For example;

By Dual Tone Multi-Frequency (DTMF)—either an entirely numerical password, or by spelling out words on an alphanumeric keypad;

By Voice Recognition—using voice recognition technology to recognize the password; or, By Mobile Originated Short Message—the recipient would send a short message to the system containing the password.

The present embodiment can be further enhanced by using a voice authentication method to ensure that the person attempting retrieval of the message is indeed the intended recipient 40. For obvious reasons, a voice authentication method is preferably performed in the e-mail server 30, which would likely be a dedicated server that is part of the total system, prior to accepting the password, or shared secret 55. This is also known as a question mechanism. An advantage associated with the above-mentioned technique is that it gives both the sender 10 and the recipient 40 control over which messages are retrieved, and when they are retrieved. To provide further flexibility and an additional degree of security, the parties may have two, or more, shared secrets, one for normal confidentiality and one for highly confidential, or "top secret" material. Additionally, the parties can establish a shared secret for a single particular transaction. Those skilled in the art would be able to derive other various techniques, such as phoning a help desk and offering the password etc., for transferring the password 55 to the e-mail server 30 without venturing from the spirit of the present invention.

According to the present embodiment, an encrypted e-mail message is delivered to the recipient's e-mail server in a completely secure method since it is encrypted. Then, the recipient is immediately notified of receipt of the message, e.g., via conventional cellular, or other communication methods, and the recipient has the option of providing the server with the decryption key, or password, in order to have the decrypted message converted into a proper format and transmitted to the recipient. The fact that the password is revealed to the server carries a much lower risk than would otherwise be born since the password is only shared with the server, directly from the recipient, and does not pass through various other machines where it is susceptible to being intercepted. Also, as explained above, it is agreed by both parties, prior to the sender sending the message, that this level of risk is acceptable. Although the likelihood is remote, it is possible that the password would be intercepted by an unscrupulous third party, "listening" to the recipient's mobile communication channel, and used to attempt to decode additional e-mail messages directed to the recipient. However, this type of risk can be easily obviated by the parties agreeing to change passwords either after each transmission or at least often enough to minimize the risk of having a third party obtain and use the password.

Although the present embodiment has been described using cellular technologies, this embodiment, as well as other embodiments, is not limited to the intended message recipient receiving the message via cellular technologies. For example, the message recipient could receive the messages on a public computer where Internet browsing is enabled.

Embodiment 2

Figure 2:
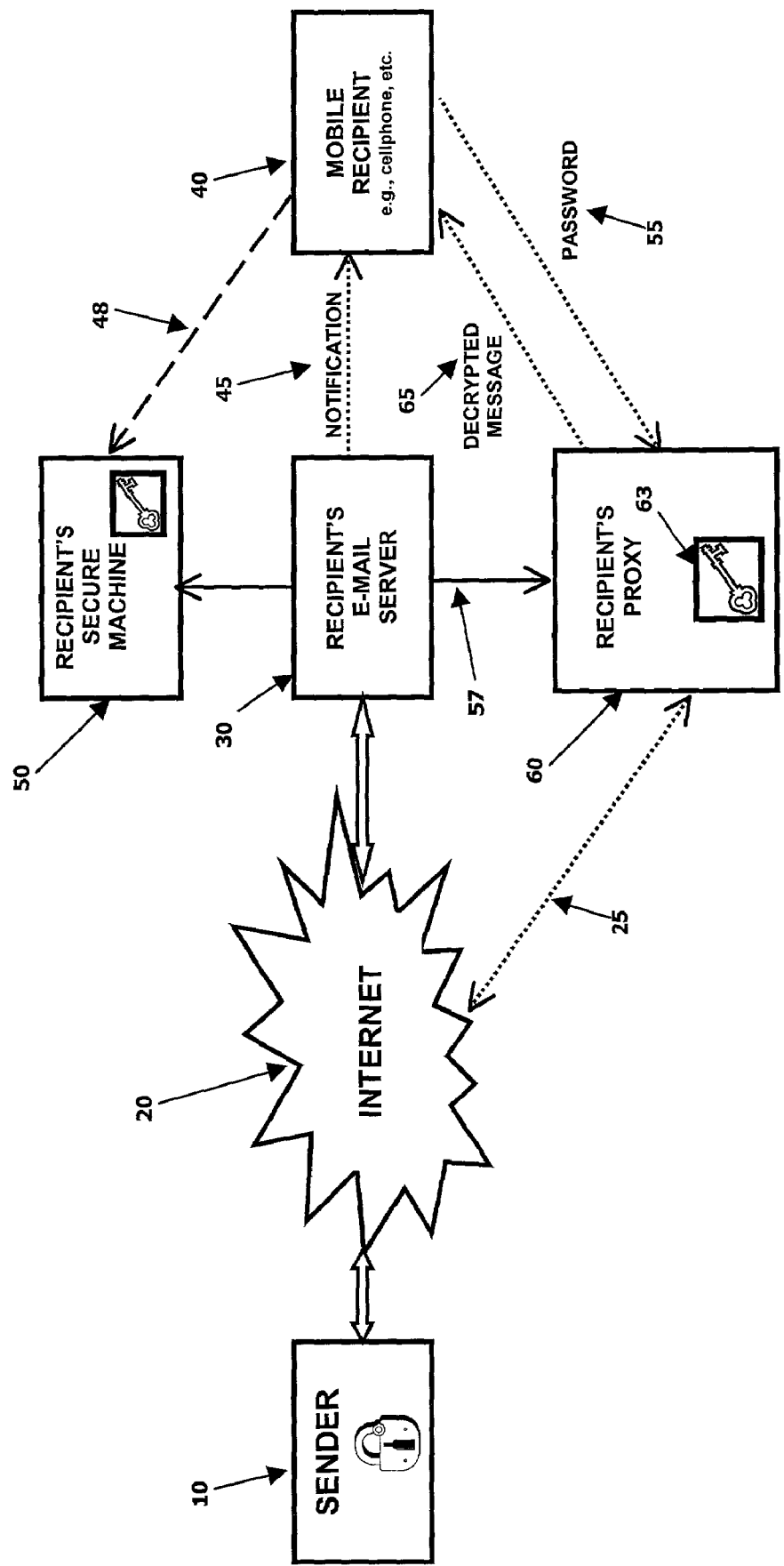
FIG. 2 is a diagrammatic view of a second embodiment of the present invention.

In accordance with a second embodiment of the present invention, in reference to FIG. 2, the e-mail server 30 with e-mail-to-other format capability (acting as the intended recipient's home mailbox) provides a facility known as the recipient's "Proxy" 60. As indicated by the dotted line 25, Proxy 60 typically is operable to communicate via the Internet 20. The Proxy 60 maintains a private/public key pair to be used in the event the recipient 40 receives an encrypted e-mail message and, further, the proxy 60 can be located virtually anywhere. For example, proxy 60 can be located at the recipient's e-mail server 30 or it can be located in an entirely different location. The private key 63 is kept in a secure fashion in an area of the Proxy 60 identity that is unaccessible to unauthorized users and, if desired, can itself be encrypted with a password known only by the recipient 40.

When first establishing the Proxy 60, the recipient 40 applies for a key pair. Subsequently, after the key pair has been established, the recipient 40 encrypts the private key with yet another password using any of a variety of different known techniques, and transfers the encrypted private key to the system to act as his Proxy 60. The sender 10, wishing to send an e-mail message to the recipient 40 chooses whether to have the server 30 send the e-mail message directly to the recipient's secure machine 50 (using a dedicated key pair and e-mail address), thereby guaranteeing maximum security but preventing the recipient 40 from receiving the e-mail message in any e-mail-to-other format method, or sending the e-mail message to the Proxy 60 with a priori knowledge that the Proxy 60 is a reasonably secure alias for the recipient.

As mentioned previously in connection with the first embodiment, as represented by the thick dashed line 48 in FIG. 2, connecting recipient 40 and secure machine 50, if the recipient decides to defer message retrieval until a later time, when he can retrieve and decrypt the message in a more secure manner on secure machine 50, he must physically go to the location of secure machine 50. The sender 10 would typically be aware that sending the encrypted e-mail message to the Proxy 60 allows the recipient 40 to receive the e-mail message in a variety of formats but that sending the e-mail message to the Proxy 60 and using the private key 63 to decrypt its contents is ultimately slightly less secure than sending the e-mail message directly to the recipient's secure machine 50. Of course, the use of a proxy, as described with respect to this embodiment, is not limited to a private/public key scheme. Other encryption/decryption methods, such as the shared secret scheme discussed above, may also be used with the proxy.

The recipient 40 can enhance the security of the Proxy 60 by defining a series of rules limiting the e-mail message traffic allowed to enter the Proxy 60. For example, rules could be established in the Proxy where only e-mail messages from certain specified senders would be accepted. Further, messages of a specified length, with a specified subject, sent during a specified time and/or sent from certain e-mail hosts, can be either deleted upon receipt or transferred directly to the recipient's secure system, i.e., the system where decryption can be carried out without the need for transmitting the password or key information over another network or through another, third party, machine. Accordingly, the recipient is afforded reasonable control over messages that he is willing to accept in this fashion.

If the incoming e-mail message meets the restrictions imposed by the recipient's rules, the e-mail message will be accepted by the Proxy and the recipient will be informed by the system that an encrypted e-mail message has been received by the Proxy. The recipient will also be informed of certain characteristics corresponding to the e-mail message, such as sender's identity, subject, length, whether there is any attachments, etc. The recipient then instructs the Proxy 60 to encrypt the message further, using his own public key or, possibly, instructs the Proxy to delete the message.

In accordance with the present embodiment, after determining whether to retrieve the e-mail message, the recipient 40 decides whether to retrieve the message via his own secure system 50, or whether to instruct the Proxy 60 to decrypt and process the message using one of the e-mail-to-other format methods. If the recipient 40 decides to have the Proxy 60 send him the decrypted e-mail message, the Proxy then requests the necessary password 55 from the recipient 40 to decode the private key. If the password is accepted by the proxy 60 the message is decrypted 65 and delivered to the recipient 40 in the specified format.

As mentioned in regard to the previous embodiment, the password can be offered using a variety of methods:

By Dual Tone Multi-Frequency (DTMF)—either an entirely numerical password, or by spelling out words on an alphanumeric keypad;

By Voice Recognition—using voice recognition technology to recognize the password; or, By Mobile Originated Short Message—the recipient would send a short message to the system containing the password.

These methods could be further enhanced by using voice authentication methods to ensure that the party acting on behalf of the recipient indeed has the authority to do so. For example, voice codes could be stored within the Proxy 60 and prior to accepting any password 55 from a party attempting to act on behalf of the recipient 40, the party's voice could be checked against the stored voice codes to verify authorization. Other, seemingly simpler methods, may also be employed, such as a challenge request where a user is asked to answer a question to which only the user knows the answer, e.g., the maiden name of the user's mother. Of course, these techniques apply equally to the other embodiments discussed herein as well.

Upon receipt of the authorized password 55, the Proxy 60 accesses the area that is unaccessible to unauthorized users, requests the decrypted private key and uses the decrypted key to retrieve/decrypt the encrypted e-mail message 57. Using the required e-mail-to-other format method to convert the message to the format required by the recipient at that time, i.e., voice for a receiving the message over a cellular telephone, facsimile data for receiving the e-mail message over facsimile machine, etc., the Proxy 60 then delivers the formatted, decrypted message 65 to the recipient 40.

On the other hand, if the incoming e-mail message fails to meet the criteria established by the recipient in the Proxy 60, a variety of options can be employed by the recipient 40. For example, the e-mail message can be immediately rejected and a notice sent by the System Administrator of server 30 indicating that the e-mail message was sent to the Proxy 60 and, further, requesting that the sender 10 use the recipient's personal public key to encode the message and send it to the recipient's secure e-mail address on secure machine 50. Alternatively, in the Proxy 60, the e-mail message and/or its attachment(s) can be encrypted if it has not yet been encrypted, or it can be further encrypted if it has already been encrypted by the sender 10. Because this particular encryption is performed within the Proxy 60, the recipient's public key, which was stored in the Proxy when the Proxy was initialized, as discussed previously, can be used. The encrypted, or further encrypted, e-mail message is then stored in the recipient's secure e-mail message inbox 50 or in the recipient's Proxy e-mail message inbox 60. Accordingly, the encrypted e-mail message can only be decoded by the recipient using his own private key.

An advantage associated with the present, second, embodiment is that, similar to the first embodiment described above, it provides both the sender 10 and the recipient 40 control over which messages are retrieved, how they are received, and when. Additionally, further protection is provided for e-mail messages retrieved using a system in accordance with the second embodiment since the recipient 40 can restrict which messages are accepted in the Proxy account. Also, a sender can choose to send or not send a message to the Proxy. Also the password is never transmitted over the air, it is not disclosed at the point of requirement but is set up in advance—possibly months earlier.

In accordance with this embodiment, the message is delivered to the recipient's e-mail provider 30 in a manner that is completely secure. This mechanism could be further enhanced with a password selection mechanism that offers single-use, randomly distributed, passwords, discussed later. The fact that the password is revealed to the system carries minimum risk because, as explained previously, it is further protected and, ultimately, is part of the working practice of the system. Furthermore, the recipient could frequently change the key pair and he could also change the password required to access the private key even more frequently. Accordingly, it would be virtually impossible to intercept and decode encrypted e-mail messages unless the interceptor had the precise key at the precise time and he also was able to gain authorization for supplying the key by getting around the voice recognition, password, or other such authorization system employed.

Embodiment 3

Figure 3:
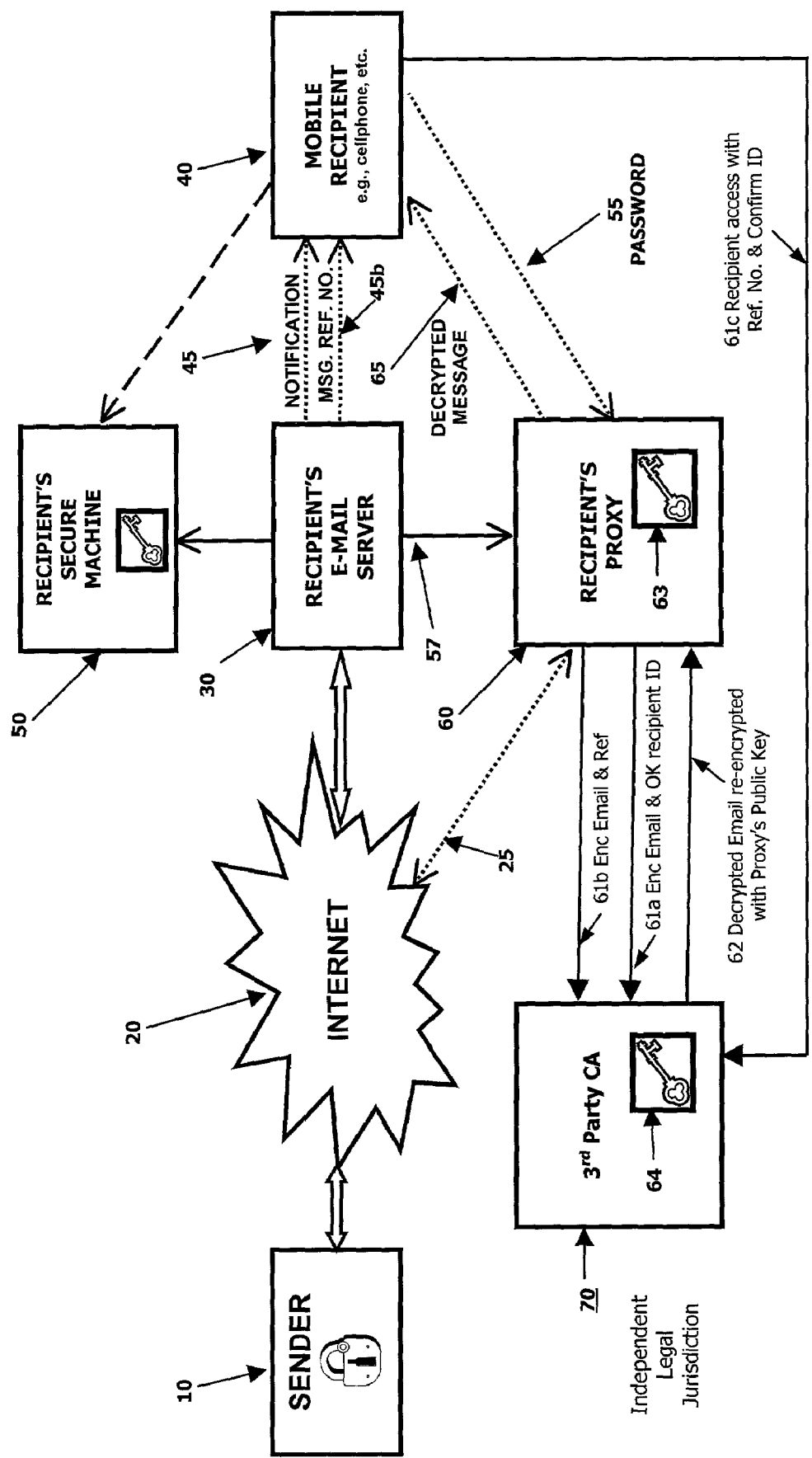
FIG. 3 is a diagrammatic view of a third embodiment of the present invention.

According to a third embodiment of the invention, a special Certificate Authority system is established in a system similar to that of embodiment 2 where a private key 64 is stored by an independent third party 70 that is unrelated to the e-mail operator 30. It should be noted that the third party 70 can be located in any location and often can be advantageously located in a jurisdiction, legal or otherwise, that is different than the jurisdiction of either the sender 10, the recipient 40, or any of the other system components. Referring to FIG. 3, upon receipt of an encrypted e-mail message 57 by the recipient's Proxy 60, the recipient 40 can then decide to accept or reject the e-mail message. If the recipient decides to accept the e-mail message, the decrypted e-mail message, decrypted using the private key, is retrieved from the third party 70 as described below.

Retrieval of the decrypted e-mail message from the third party 70 can be achieved in several ways. For example, the recipient 40 can provide the password 55 used to decrypt the private key, using any of the variety of methods previously discussed, as well as any other appropriate method. Other appropriate methods include techniques such as querying a series of identifying questions where the predefined answers are known only to the recipient, as discussed above, or voice authentication. Results of these security checks are then forwarded to the third party 70, along with the encrypted e-mail message 61a if the security check results in authorization being granted. The third party decrypts the e-mail message using the Proxy's private key 64. The plain text message, for example, would then be encrypted using the e-mail provider's public key and then sent back to the proxy 62. The proxy then uses its own private key 63 to decrypt the message into a plain text message. This plain text message can then be used to perform the required e-mail-to-other format conversion and send the message to recipient 40 as a decrypted message 65.

The e-mail provider 30 can provide the recipient 40 with a unique identifier 45b for the e-mail message and would also forward the encrypted e-mail message to the third party 61b via the proxy 60. The recipient 40 can access his account at the third party himself 61c, using any of the variety of methods listed above or other appropriate methods such as a series of identifying questions, etc.

The encrypted e-mail is supplied to the third party together with an identifier. Upon authorization (described below) the third party decodes the e-mail message and passes it back to the e-mail server 30.

The recipient 40 also supplies the unique identifier relating to the e-mail message 61c. The third party 70 decrypts the e-mail message using the recipient's Proxy private key. This decrypted e-mail message should be protected. Protection methods include using the e-mail server's public private key (as described below), using a dedicated, secure communications channel, using a VPN (virtual private network), not shown, to establish a secure channel in an otherwise public Internet, or by any other appropriate methods.

The plain text message is then encrypted using the e-mail provider's public key and the message is sent back to the e-mail provider. The e-mail provider then uses its own private key to decrypt the message into a plain text message. This plain text message could then be used to perform the required e-mail-to-other format conversion as desired.

It is important to note that the private key or shared password is never made available to the e-mail server. Also the methods described elsewhere to increase security by changing passwords are equally applicable here.

In accordance with this embodiment of the invention, even though the additional procedures make the present embodiment more complex than the embodiments previously described, the additional procedures provide increased security to the system. The private key is never known to the operator, and the recipient has the choice of supplier of the private key. The supplier of the private key can be a well-trusted third party or it can even be a separate machine that is under the control of the recipient, such as his corporate e-mail server.

In the event an encrypted message is compromised, e.g., for some reason a third party was able to intercept the recipient's key pair and decrypt the encrypted e-mail message, the degree to which the system is compromised is limited to that single particular message. This is primarily the case in the single-use key situation. As previously described, there is a degree of control over even this risk due to the filtering on the Proxy 60 and the sender's choice to use the Proxy 60 and not the recipient's secure machine 50. Also, time expiration methods are inherent within the certificate schemes. It is assumed that the proxy methods described herein will include frequent changes of passwords possibly even to the extent of a single-use password.

A system operating under a PKI has several options that affect the level of security (specifically key length); some of these are restricted by law in some jurisdictions. The methods in accordance with the embodiments of the present invention are independent of any single particular implementation. The afforded security is primarily a function of the PKI implementation together with the unique adaptations provided by the present invention.

The present embodiment comprises merging Public Key Infrastructure (PKI) techniques with e-mail-to-other format methods. This merger allows the benefits of the inherent security of PKI together with the mobility enhancements offered by the e-mail-to-other format services. Again, presently, there exists no method that allows secure access to e-mail messages without the direct use of the recipient's PC, or some other dedicated machine with sufficient processing power. As mentioned above in regard to embodiment 1, the invention is not limited to cellular technologies, other mechanisms, such as public Internet browsers, etc., can be used to access messages.

Embodiment 4

Figure 4:
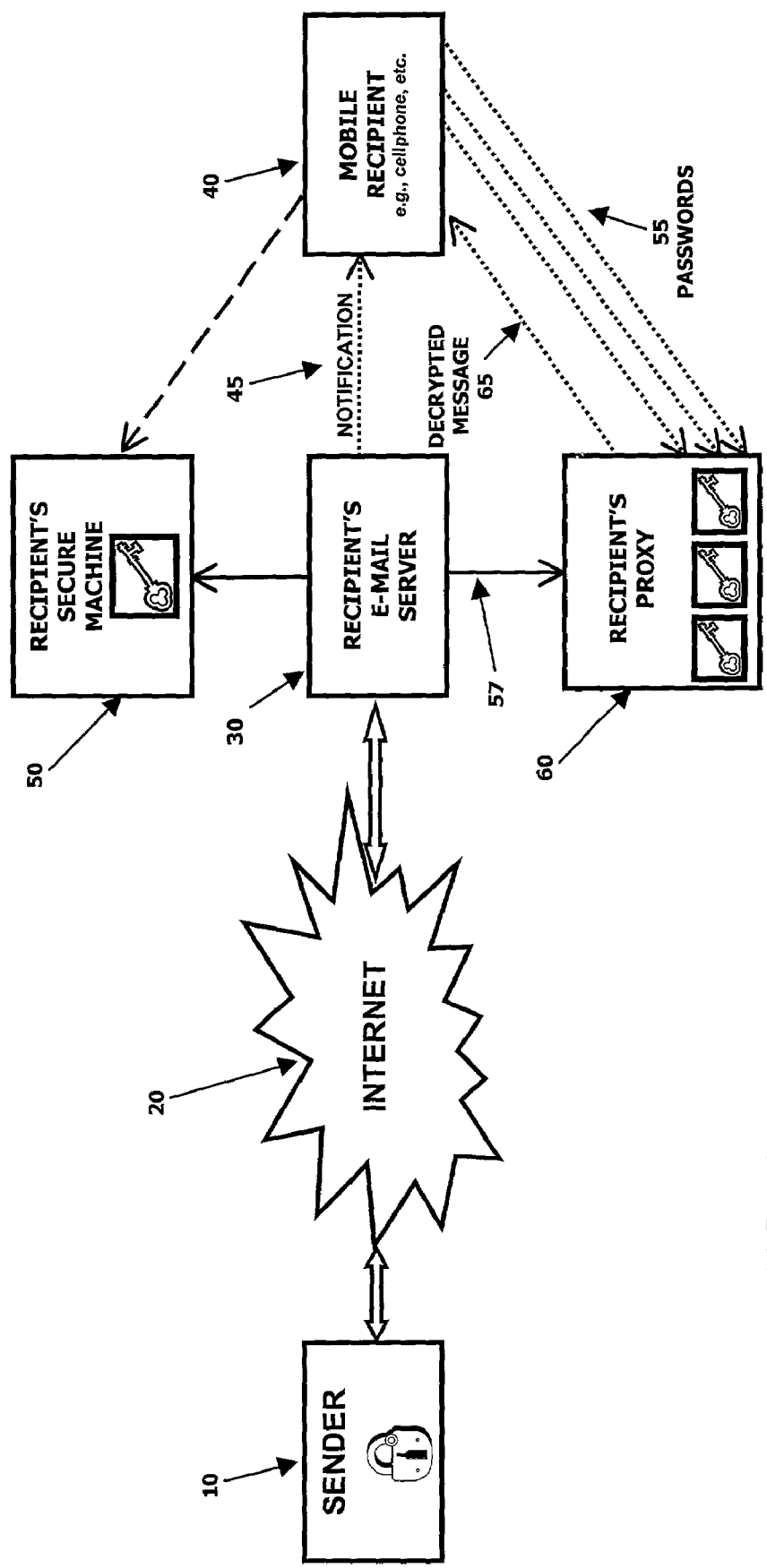
FIG. 4 is a diagrammatic view of a fourth embodiment of the present invention.

In accordance with a fourth embodiment of the present invention, referring to FIG. 4, an e-mail server 30 with e-mail-to-other format capability, and acting as the intended recipient's home mailbox, similar to the second embodiment, also provides a facility that may be regarded as the recipient's "Proxy" 60.

When first establishing the Proxy 60, the recipient 40 typically applies for a key pair in the normal fashion, as discussed previously. The recipient 40 then encrypts the private key using another password (as already discussed, a variety of techniques are possible) and transfers the encrypted key to the facility acting as the recipient's Proxy 60. In accordance with this embodiment, the process of establishing a key pair and encrypting the private key is repeated an arbitrary number of times to establish several secure key pairs. Each private key can be stored with a different access password in an area of the Proxy 60 that is unaccessible to unauthorized users.

When a sender 10 attempts to look-up the recipient's Proxy 60 in order to obtain the certificate, the sender 10 randomly receives one of the public keys with a short expiration time, i.e., several minutes, together with a notice explaining the short expiration time. The Proxy 60 can be the recipient's CA, however, this is not required. Once a public key is issued to the sender 10, that particular public-private key pair is disabled and not issued again.

As an enhancement, a system in accordance with this embodiment can be modified slightly so that the key pairs are not generated in advance, but rather on demand when the sender 10 attempts to look-up the recipient Proxy's certificate. In this situation, the single-use private key would be stored on the system. Accordingly, there is a trade-off between ease of use and a reduction in the protection afforded by the private key.

When the e-mail message is ultimately received, a time stamp that is typically included in the message overhead is checked to ensure that the message was originated in the short time window allowed by the certificate. If the time stamp indicates that the message originated outside the allotted time, the message is discarded. If the sender 10 wishes to send an e-mail message to the recipient 40, she would have the choice of sending the e-mail message directly to the recipient's secure machine 50, thereby guaranteeing maximum security but preventing the recipient from receiving the e-mail message in any e-mail-to-other format. Alternatively, the sender 10 can choose to send the e-mail message 57 to the recipient's Proxy 60 with a priori knowledge that this is a fairly secure alias for the recipient which allows the recipient 40 to receive e-mail messages in a variety of formats.

Similar to the second embodiment, discussed above, the recipient can enhance the security of the Proxy 60 by defining a series of rules; for example only certain senders would be accepted, messages of a certain length, with a certain subject, sent at certain time, from certain e-mail hosts, margin allowed on the time window, etc. This allows the recipient reasonable control over messages that he is willing to accept in this fashion.

If the incoming e-mail message meets the restrictions imposed by the recipient, the e-mail message will be accepted and the recipient will be informed by the system that an encrypted e-mail message has been received by the Proxy 60. The message will inform the recipient of the characteristics of the e-mail message and which key pair is used (based on time or other means). The recipient then instructs the Proxy 60 to encrypt the message further, using his own public key or, possibly, instructs the Proxy to delete the message.

In accordance with the present embodiment, after determining whether to retrieve the e-mail message, the recipient 40 then decides whether to retrieve the message via his own secure system 50, or whether to instruct the Proxy 60 to decrypt and process the message using one of the e-mail-to-other format methods. If the recipient 40 decides to have the Proxy 60 send him the decrypted e-mail message, the Proxy then requests the necessary password 55 from the recipient 40 to decode the private key. If the password is accepted by the proxy 60 the message is decrypted 65 and delivered to the recipient 40 in the specified format.

As mentioned in regard to the previous embodiment, the password can be offered using a variety of methods:

By Dual Tone Multi-Frequency (DTMF)—either an entirely numerical password, or by spelling out words on an alphanumeric keypad;

By Voice Recognition—using voice recognition technology to recognize the password; or, By Mobile Originated Short Message—the recipient would send a short message to the system containing the password.

These methods could be further enhanced by using voice authentication methods to ensure that the party acting on behalf of the recipient indeed has the authority to do so. For example, voice codes could be stored within the Proxy 60 and prior to accepting any password 55 from a party attempting to act on behalf of the recipient 40, the party's voice could be checked against the stored voice codes to verify authorization. Another technique that can be used is the challenge, or question mechanism, where a response to a particular question is solicited. The question being one to which only the user knows the answer.

Upon receipt of the authorized password 55, the Proxy 60 accesses the area unaccessible to unauthorized users and requests the decrypted private key and uses the decrypted key to retrieve the encrypted e-mail message. Using the required e-mail-to-other format method to convert the message to the format required by the recipient at that time, i.e., voice for a receiving the message over a cellular phone, facsimile data for receiving the e-mail message over facsimile machine, etc., the Proxy 60 then delivers the formatted, decrypted message 65 to the recipient 40.

On the other hand, if the incoming e-mail message fails to meet the recipient's criteria, established in the Proxy 60, a variety of options can be employed by the recipient 40. For example, the e-mail message can be immediately rejected and a notice sent by the System Administrator of server 30 indicating that the e-mail message was sent to the Proxy 60 and, further, requesting that the sender 10 use the recipient's personal public key to encode the message and send it to the recipient's secure e-mail address on secure machine 50. Alternatively, in the Proxy 60, the e-mail message and/or its attachment(s) can be encrypted if it has not yet been encrypted, or it can be further encrypted if it has already been encrypted by the sender 10. Because this particular encryption is performed within the Proxy 60, the recipient's public key, which was stored in the Proxy when the Proxy was initialized, as discussed previously, can be used. The encrypted, or further encrypted, e-mail message is then stored in the recipient's secure e-mail message inbox 50 or in the recipient's Proxy e-mail message inbox 60. The encrypted e-mail message can now only be decoded by the recipient using his own private key, as distinguished from the slightly less secure proxy, private key.

An advantage associated with the present, fourth, embodiment is that, similar to the first embodiment described above, it provides both the sender 10 and the recipient 40 control over which messages are retrieved, how they are received, and when. Additionally, further protection is provided for e-mail messages retrieved using a system in accordance with the second embodiment since the recipient 40 can restrict which messages are accepted in the Proxy account. Also, a sender can choose to send or not send a message to the Proxy. One important advantage achieved by the present embodiment different from the other embodiments is that there are many single use time restricted key pairs.

Embodiment 5

Figure 5:
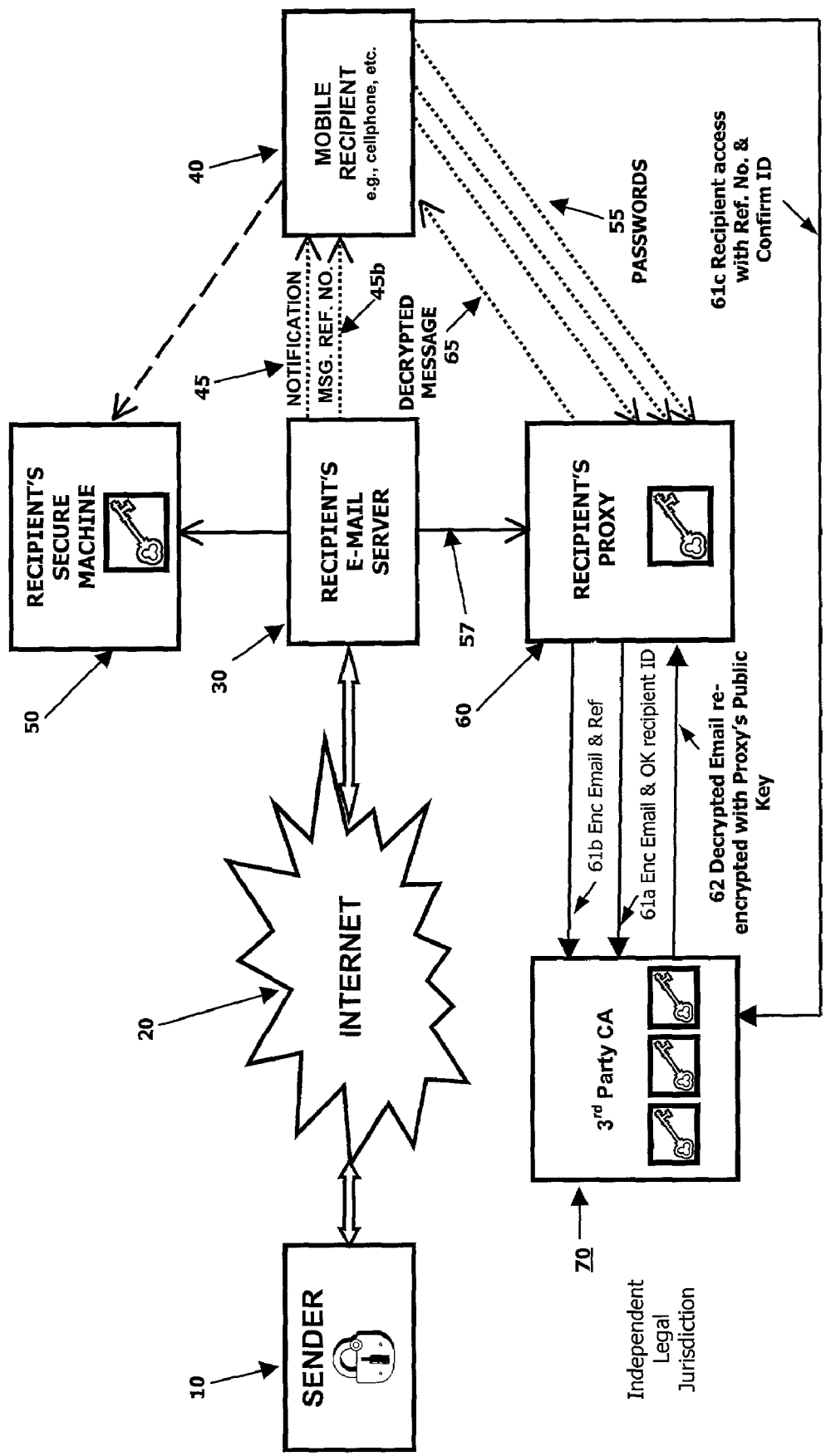
FIG. 5 is a diagrammatic view of a fifth embodiment of the present invention.

Referring to FIG. 5, according to a fifth embodiment, a special Certificate Authority system is established in a system similar to the system of embodiment 3 where the private key is stored by an independent third party 70 that is unrelated to the e-mail operator 30. This third party, like the one described in embodiment 3, can be located in a different legal jurisdiction.

In accordance with this embodiment, the process of establishing a key pair and encrypting the private key is repeated an arbitrary number of times to establish several secure key pairs. Each private key can be stored with a different access password in an area of the Proxy 60 not accessible to unauthorized users.

When a sender 10 attempts to look up the recipient's Proxy 60 in order to obtain the certificate, the sender 10 randomly receives one of the public keys with a short expiration time, i.e., several minutes, together with a notice explaining the short expiration time. Once a public key is issued to the sender 10, that particular public-private key pair is disabled and not issued again.

As an enhancement, a system in accordance with this embodiment can be modified slightly so that the key pairs are not generated in advance, but rather on demand when the sender 10 attempts to look-up the recipient's Proxy's certificate. In this situation, the single-use private key would be stored on the system. Accordingly, there is a trade-off between ease of use and a reduction in the protection afforded by the private key.

When the e-mail message is ultimately received, a time stamp that is typically included in the message overhead is checked to ensure that the message was originated in the short time window allowed by the certificate. If the time stamp indicates that the message originated outside the allotted time, the message is discarded. If the sender 10 wishes to send an e-mail message to the recipient 40, she would have the choice of sending the e-mail message directly to the recipient's secure machine 50, thereby guaranteeing maximum security but preventing the recipient from receiving the e-mail message in any e-mail-to-other format. Alternatively, the sender 10 can choose to send the e-mail message 57 to the recipient's Proxy 60 with a priori knowledge that this is a fairly secure alias for the recipient which allows the recipient 40 to receive e-mail messages in a variety of formats.

Upon receipt of an encrypted e-mail message 57 by the recipient's Proxy 60, the recipient 40 can then decide to accept or reject the e-mail message. If the recipient chooses to accept the e-mail message, the decrypted e-mail message, decrypted using the private key, is retrieved from the third party 70.

This retrieval can be achieved in several ways. For example, the recipient 40 could provide the password used to decrypt the private key, using any of the variety of methods listed above, as well as any other appropriate method. Other appropriate methods include techniques, such as, querying a series of identifying questions where the predefined answers are known only to the recipient, or voice authentication. Results of these security checks are then forwarded to the third party together with the encrypted e-mail message 61*a*. The third party would decrypt the e-mail message using its corresponding private key. The plain text message would then be encrypted using the e-mail message provider's public key and then sent back to the e-mail message provider 62. The e-mail provider would then use its own private key to decrypt the message into a plain text message. This plain text message could then be used to perform the required e-mail-to-other format conversion.65

The e-mail provider 30 can provide the recipient 40 with a unique identifier for the e-mail message and would also forward the encrypted e-mail message to the third party 61*b*. The recipient 40 could access his account at the third party himself 61*c* using any of the variety of methods listed above or other appropriate methods such as a series of identifying questions, etc.

The recipient 40 also supplies the unique identifier relating to the e-mail message. The third party decrypts the e-mail message using the recipient's Proxy private key. This decrypted e-mail should be protected. Protection methods include using the e-mail server's public private key (as described below), using a dedicated, secure communications channel, using a VPN (virtual private network) to establish a secure channel in an otherwise public Internet, or by any other appropriate methods.

The plain text message is then encrypted using the e-mail provider's public key and the message is sent back to the e-mail provider 62. The e-mail provider then uses its own private key to decrypt the message into a plain text message. This plain text message could then be used to perform the required e-mail-to-other format conversion as desired 65.

In accordance with this enhancement to the present embodiment of the invention, even though the additional procedures make the overall procedure more complex, they add increased security to the system. The private key is never known to the operator, and the recipient has the choice of supplier of the private key. The supplier of the private key can be a well-trusted third party or it can even be a separate machine that is under the control of the recipient, such as his corporate server.

In the event an encrypted message is compromised, i.e., for some reason a third party was able to intercept the recipient's key pair and decrypt the encrypted e-mail message, the degree to which the system is compromised is limited to that one particular message. As previously described, there is a degree of control over even this risk due to the filtering on the Proxy 60 and the sender's choice to use the Proxy 60 and not the recipient's secure machine 50.

A system operating under a PKI has several options that affect the level of security (specifically key length); some of these are restricted by law in some jurisdictions. The methods in accordance with the embodiments of the present invention are independent of particular implementation. The afforded security is primarily a function of the PKI implementation together with the unique adaptations provided by the present invention.

The fifth embodiment, similar to the second embodiment described above, comprises merging Public Key Infrastructure (PKI) techniques with e-mail-to-other format methods. This merger allows the benefits of the inherent security of PKI together with the mobility enhancements offered by the e-mail-to-other format services. However, the third party 70 is established with a predefined number of private-public key pairs, each protected by a respective password or access code. In this manner, the recipient can use each key pair once, thereby increasing the security of the system even further.

Also, in accordance with a further embodiment of the invention, when a public/private key pair is established, the public key is obtained by the sender through standard methods, as described previously, however, the private key is held by a Certificate Authority (CA) who maintains the security of the private key. The CA issues short-term "licenses" to use the private key, to specified users, upon receipt of an authorization grant provided by the recipient. The authorization grant is provided to the CA via a phone call or any other appropriate method as described previously. Further, the specified users of the short-term licenses include the recipient's own machine and/or the recipient's proxy. As mentioned above in regard to embodiment 1, the invention is not limited to cellular technologies, other mechanisms, such as public Internet browsers, etc., can be used to access messages.

A further enhancement that applies equally to all embodiments of the present invention involves having the sender specify in the transmitted message whether or not the message can be converted into another format, other than the format of the transmitted message, i.e., e-mail-to-other conversion. Also, the sender can be given the capability to generate a password, either randomly or by user input, and send the password to the intended recipient of the message. It is favorable to send the password to the recipient in an "out-of-band" method, such as by separate electronic message or by a forced phone message. Out-of-Band techniques are employed to provide security against outside persons, or machines, intercepting both the encrypted message and the password that can be used to invoke decryption.

What is claimed is:

1. An electronic message retrieval system comprising:
    a sender operable to transmit an encrypted electronic message, directed to a mobile device of a specified recipient, over a transmission medium;
    a message retrieval device associated with the specified recipient operable to receive the encrypted electronic message and provide a notification message to the mobile device indicating receipt of the encrypted electronic message by the message retrieval device; wherein
    said mobile device being operable to receive the notification message from said message retrieval device and in response thereto provide a secret password to said message retrieval device to initiate decryption of the encrypted electronic message,
    wherein said message retrieval device is further operable to convert the decrypted electronic message into a format that is compatible with the mobile device, and to transmit the converted decrypted electronic message to the mobile device.

2. An electronic message retrieval system as claimed in claim 1, wherein the format includes at least one of an audible format, a facsimile format, and a text format.

3. An electronic message retrieval system as claimed in claim 1, wherein said message retrieval device comprises:
    a converter device operable to convert the format of the decrypted electronic message into a format recognized by the mobile device; and
    an output unit from which the converted decrypted electronic message is provided to the mobile device.

4. An electronic message retrieval system as claimed in claim 3, wherein said sender encrypts the electronic message in accordance with a specified electronic key and said message retrieval device decrypts the encrypted electronic message using said specified electronic key.

5. An electronic message retrieval system as claimed in claim 1, further comprising:
    a password transmission unit operable to transmit a password to said specified recipient.

6. An electronic message retrieval system as claimed in claim 5, further comprising:
    a password transmission path through which the secret password is transmitted to said recipient's mobile device; and
    a message transmission path, different from said password transmission path, through which said decrypted electronic message is provided to the recipient's mobile device.

7. An electronic message retrieval system as claimed in claim 6, wherein said password is generated by the sender and communicated to the password transmission unit in a message different from the encrypted electronic message.

8. An electronic message retrieval system as claimed in claim 1, wherein the mobile device is a cell phone that is unable to decrypt the encrypted electronic message, and wherein a portion of said transmission medium is the Internet.

9. An electronic message retrieval system as claimed in claim 1, wherein said encrypted electronic message comprises an indication as to whether the encrypted electronic message can be converted into a different format.

10. An electronic message retrieval system as claimed in claim 3, further comprising:
    a secure device operable to receive and decrypt the encrypted electronic message, wherein said secure device is operable to receive messages in the same format as the format of the decrypted electronic message.

11. An electronic message retrieval system as claimed in claim 3, wherein said encryption is performed by the sender using a publicly accessible key associated with the recipient.

12. An electronic message retrieval system as claimed in claim 3, wherein said mobile device is operable to receive messages in a format different from the format of the decrypted electronic message.

13. An electronic message retrieval system comprising:
    a sender operable to transmit an encrypted electronic message to a mobile device of a specified recipient that is unable to decrypt the encrypted electronic message;
    a message retrieval device operable to receive the encrypted electronic message and provide a notification message to the mobile device when the encrypted electronic message is received by the message retrieval device, wherein said mobile device is operable to receive messages in a format different from the format of the encrypted electronic message, said message retrieval device comprising;

a decryption device operable to decrypt the encrypted electronic message upon receipt of a password from the mobile device;

a converter device operable to convert the decrypted electronic message into a format recognized by the mobile device;

said electronic message retrieval system further comprising;

a secure device operable to receive and decrypt the encrypted electronic message, wherein said secure device is operable to receive messages in the same format as the format of the encrypted electronic message.

14. An electronic message retrieval method comprising:

sending an encrypted electronic message over a communication network to a recipient's message retrieving device;

notifying a recipient's mobile device of receipt of the encrypted electronic message;

determining whether to defer retrieval of the encrypted electronic message or retrieve the encrypted electronic message immediately on the recipient's mobile device; and if it is determined that retrieval of the encrypted electronic message is to be deferred, receiving and decrypting said encrypted electronic message on a secure machine associated with the recipient; or if it is determined that retrieval of the encrypted electronic message is to be performed immediately, providing a password to the recipient's message retrieving device to render the recipient's message retrieving device operable to decrypt the encrypted electronic message, and converting the decrypted electronic message into a format compatible that is compatible with the recipient's mobile device.

15. An electronic message retrieval system comprising:

a sender operable to transmit an encrypted electronic message over a communication network directed to a specified recipient's mobile device that is unable to decrypt the encrypted electronic message;

a message retrieval device operable to receive the encrypted electronic message and provide a notification message to the mobile device when the encrypted electronic message is received by the message retrieval device;

a proxy device operable to receive the encrypted electronic message from the message retrieval device when the recipient's mobile device provides a proxy instruction to said message retrieval device and operable to decrypt and transmit a decrypted electronic message to said recipient's mobile device when the recipient provides a password to said proxy device.

16. An electronic message retrieval system as claimed in claim 15, wherein said proxy decrypts said encrypted electronic message by using a private key securely stored on said proxy.

17. An electronic message retrieval system as claimed in claim 15, said proxy device comprising:

a decryption device operable to decrypt an encrypted private key associated with the recipient and also decrypt the encrypted electronic message, wherein the decryption device is activated upon receipt of a password; and a converter device operable to convert the decrypted electronic message into a format recognized by the mobile device.

18. An electronic message retrieval system comprising:

a sender operable to transmit an encrypted electronic message over a communication network directed to a specified recipient's mobile device, wherein said encryption is performed using a publicly accessible key associated with the recipient;

a message retrieval device operable to receive the encrypted electronic message and provide a notification message to the recipient's mobile device when the encrypted electronic message is received by the message retrieval device, wherein said recipient's mobile device is operable to receive messages in a format different from the format of the encrypted electronic message received by the message retrieval device;

a proxy device operable to receive the encrypted electronic message from the message retrieval device when the recipient provides a proxy instruction, said proxy device comprising;

a decryption device operable to decrypt an encrypted private key associated with the recipient and also decrypt the encrypted electronic message, wherein the decryption device is activated upon receipt of a password; and a converter device operable to convert the decrypted electronic message into a format recognized by the mobile device;

said electronic message retrieval system further comprising;

a secure device operable to receive and decrypt the encrypted electronic message, wherein said secure device is operable to receive messages in the same format as the format of the encrypted electronic message.

19. An electronic message retrieval system in accordance with claim 18, further comprising a third party authority operable to receive said encrypted electronic message from said proxy device and decrypt the encrypted electronic message using a public key corresponding to said proxy device.

20. An electronic message retrieval system in accordance with claim 19 wherein said third party authority is located in a legal jurisdiction other than a legal jurisdiction in which said recipient's mobile device is located.

21. An electronic message retrieval system in accordance with claim 19 wherein said third party authority is operable to receive a reference designation corresponding to said encrypted electronic message along with said encrypted electronic message.

22. An electronic message retrieval system in accordance with claim 21 wherein said third party authority is operable to receive said reference designation corresponding to said encrypted electronic message from said specified recipient and said decryption of said encrypted electronic message is controlled in accordance with the reference designation received from said specified recipient.

23. An electronic message retrieval method comprising:

sending an encrypted electronic message over a communication network to a recipient's message retrieving device, wherein said encryption is performed using a publicly accessible key associated with the recipient;

alerting the recipient's mobile device of the receipt of the encrypted electronic message;

determining based on a message from the recipient's mobile device whether to defer retrieval of the encrypted electronic message or retrieve the encrypted electronic message immediately; and if it is determined that retrieval of the encrypted electronic message is to be deferred, receiving and decrypting said encrypted electronic message on a secure machine associated with the recipient; or if it is determined that retrieval of the encrypted electronic message is to be performed immediately, providing a password to a proxy device;

decrypting, in said proxy device, a private encrypted key associated with the recipient to render the proxy operable to decrypt the encrypted electronic message; and converting the electronic message into a format compatible with the recipient's mobile device from a format which is incompatible with the recipient's mobile device.

24. An electronic message retrieval system comprising:

a sender operable to transmit an encrypted electronic message over a communication network directed to a specified recipient's mobile device, wherein said encryption is performed using one of a plurality of publicly accessible keys associated with the recipient;

a message retrieval device operable to receive the encrypted electronic message and provide a notification message to the recipient's mobile device when the encrypted electronic message is received by the message retrieval device, wherein said recipient's mobile device is operable to receive messages in a format different from the format of the encrypted electronic message;

a proxy device operable to receive the encrypted electronic message from the message retrieval device when the recipient provides a proxy instruction, said proxy device comprising;

a decryption device operable to decrypt a plurality of encrypted private keys associated with the recipient and also decrypt the encrypted electronic message, wherein the decryption device is activated upon receipt of one of a plurality of passwords respectively associated with said encrypted private keys;

a converter device operable to convert the electronic message into a format recognized by the recipient's mobile device; and said electronic message retrieval system further comprising;

a secure device operable to receive and decrypt the encrypted electronic message, wherein said secure device is operable to receive messages in the same format as the format of the encrypted electronic message.

25. An electronic message retrieval method comprising:

sending an encrypted electronic message over a communication network to a recipient's message retrieving device, wherein said encryption is performed using one of a plurality of publicly accessible keys associated with the recipient;

alerting the recipient's mobile device of the receipt of the encrypted electronic message;

determining based on instructions from the recipient whether to defer retrieval of the encrypted electronic message or retrieve the encrypted electronic message immediately; and if it is determined that retrieval of the encrypted electronic message is to be deferred, receiving and decrypting said encrypted electronic message on a secure machine associated with the recipient; or if it is determined that retrieval of the encrypted electronic message is to be performed immediately, providing one of a plurality of passwords to a proxy device, said provided password being associated with the publicly accessible key used to encrypt the message;

decrypting, in said proxy device and upon receipt of said password, a private encrypted key associated with the publicly accessible key used to encrypt the message to render the proxy operable to decrypt the encrypted electronic message; and converting the electronic message into a format compatible with the recipient's mobile device from a format which is incompatible with the recipient's mobile device.

26. An electronic message retrieval system comprising:

a sender operable to transmit an encrypted electronic message, directed to a specified recipient's mobile device, over a transmission medium; the recipient's mobile device being unable to decrypt the encrypted electronic message;

a message retrieval device operable to receive the encrypted electronic message and provide a notification message to the recipient's mobile device indicating that the encrypted electronic message has been received by the message retrieval device, and to decrypt the encrypted electronic message; and wherein the recipient's mobile device is operable to receive said decrypted electronic message from said message retrieval device in a format that is different from a format of the encrypted electronic message.

* * * * *